(12) United States Patent
Jeansonne et al.

(10) Patent No.: US 11,354,232 B2
(45) Date of Patent: Jun. 7, 2022

(54) VALIDITY OF DATA SETS STORED IN MEMORY

(71) Applicant: HEWLETT-PACKARD DEVELOPMENT COMPANY, L.P., Spring, TX (US)

(72) Inventors: Jeffrey Kevin Jeansonne, Spring, TX (US); Rosilet Retnamoni Braduke, Spring, TX (US); David Plaquin, Bristol (GB); Joshua Serratelli Schiffman, Bristol (GB)

(73) Assignee: Hewlett-Packard Development Company. L.P., Spring, TX (US)

( * ) Notice: Subject to any disclaimer, the term of this patent is extended or adjusted under 35 U.S.C. 154(b) by 0 days.

(21) Appl. No.: 16/755,815

(22) PCT Filed: Jan. 29, 2018

(86) PCT No.: PCT/US2018/015759
§ 371 (c)(1),
(2) Date: Apr. 13, 2020

(87) PCT Pub. No.: WO2019/147286
PCT Pub. Date: Aug. 1, 2019

(65) Prior Publication Data
US 2020/0371909 A1 Nov. 26, 2020

(51) Int. Cl.
G06F 12/02 (2006.01)
G06F 12/0831 (2016.01)
(Continued)

(52) U.S. Cl.
CPC ...... *G06F 12/0246* (2013.01); *G06F 12/0833* (2013.01); *G06F 12/0853* (2013.01);
(Continued)

(58) Field of Classification Search
CPC ............. G06F 12/0246; G06F 12/0833; G06F 12/0853; G06F 12/0891; G06F 2212/7201;
(Continued)

(56) References Cited

U.S. PATENT DOCUMENTS 2,267,725 A 12/1941 Flett
5,930,815 A 7/1999 Estakhri et al.
(Continued)

FOREIGN PATENT DOCUMENTS

EP 2267725 A1 12/2010

OTHER PUBLICATIONS

Avinash Aravindan, Flash 101: NAND Flash vs NOR Flash, Jul. 23, 2018, https://www.embedded.com/flash-101-nand-flash-vs-nor-flash/, pp. 1-4 (Year: 2018).*

(Continued)

*Primary Examiner* — Sean D Rossiter
(74) *Attorney, Agent, or Firm* — HPI Patent Department

(57) ABSTRACT

An apparatus includes a solid-state a solid-state non-volatile computer memory; and a controller coupled to the memory. The controller to: generate a data set including a tag that indicates that the data set is valid; write the data set into a block of the memory, wherein the block includes multiple addressable locations set to a common first binary value before the write; generate a subsequent data set including a tag that indicates that the subsequent data set is valid; update the tag of the written data set to indicate that the written data set is invalid, wherein the update includes setting an addressable location corresponding to the tag to second binary value different from the first binary value; write the subsequent data set to addressable locations in the block of memory other than the addressable locations of the invalid data set.

15 Claims, 3 Drawing Sheets

(51) Int. Cl.
  *G06F 12/0853* (2016.01)
  *G06F 12/0891* (2016.01)
(52) U.S. Cl.
  CPC .. *G06F 12/0891* (2013.01); *G06F 2212/7201* (2013.01); *G06F 2212/7203* (2013.01)
(58) Field of Classification Search
  CPC ..... G06F 2212/7203; G06F 2212/7202; G06F 2212/7209
  See application file for complete search history.

(56) References Cited

U.S. PATENT DOCUMENTS

| | | | |
|---|---|---|---|
| 7,382,637 B1 | 6/2008 | Rathnavelu | |
| 8,041,886 B2 | 10/2011 | Coonen et al. | |
| 8,719,489 B2 | 5/2014 | Tzeng | |
| 2007/0260811 A1* | 11/2007 | Merry | G11C 16/349 711/103 |
| 2008/0301359 A1 | 12/2008 | Smith | |
| 2009/0070885 A1 | 3/2009 | Mersh | |
| 2010/0077136 A1* | 3/2010 | Ware | G06F 12/0246 711/103 |
| 2010/0211737 A1 | 8/2010 | Flynn | |
| 2011/0258386 A1 | 10/2011 | Conley | |
| 2014/0052914 A1* | 2/2014 | Wang | G06F 12/0846 711/119 |
| 2014/0223088 A1* | 8/2014 | Hashimoto | G06F 11/076 711/103 |
| 2016/0117266 A1 | 4/2016 | Anderson | |
| 2017/0300423 A1* | 10/2017 | Kamruzzaman | G06F 12/109 |
| 2018/0032279 A1* | 2/2018 | Davis | G06F 3/0617 |
| 2019/0114258 A1* | 4/2019 | Tsuchiyama | G06F 3/0652 |
| 2019/0179567 A1* | 6/2019 | Kanno | G06F 3/0604 |

OTHER PUBLICATIONS

Scott Chen, "What Types of ECC Should Be Used on Flash Memory?", Internet Article, Nov. 27, 2007, pp. 1-6, XP002535760.

* cited by examiner

VALIDITY OF DATA SETS STORED IN MEMORY

BACKGROUND

Flash memory is a solid-state non-volatile computer memory that has gained popularity in recent years due to greater availability and decreasing costs. One major category or configuration of the flash memory is known as a NOR flash memory.

The NOR flash memory is often used in mobile phones, scientific instruments, and medical devices. It is a type of flash memory that employs NOR logic gates. That is, the NOR flash memory produces a low output when at least one input is high.

While NOR flash memory provides a faster reading of stored information, it has long erased and write times. The NOR flash memory can further provide full address and data buses, allowing random access to any memory location.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein is a technology for an efficient storage of data into a non-volatile computer storage. Particularly, an updated data may be stored into a block of the non-volatile computer storage in such a manner that does not require an erasure of an entire block. This saves processing time, efficient use of available segments of the block, and minimizes wear on the non-volatile computer storage.

The non-volatile computer storage may include a solid-state non-volatile computer storage medium that employs NOR logic gates. For example, a NOR flash memory. In this example, a block of the NOR flash memory is initialized to become a fresh block by setting all addressable locations to the same binary value, which may be, for example, 1. Depending on the particulars of the implementation, an addressable location may be selected from a bit, byte, a word, a page, or a combination thereof. Furthermore, the addressable location of the NOR flash memory can be read in a random-access fashion; however, an erasure may include block at a time.

As described herein, a data set is written into the initialized block or the fresh block. To store a subsequent data set, the already written data set may be marked as invalid by marking a designated portion of the already written data. For example, the marking includes changing a binary value of at least one bit of the addressable location from 1 to 0. This value-change may indicate both invalidity and lack of integrity of the already written data set. Thereafter, the subsequent data set is stored into the block without overwriting the addressable location of the already written data set.

Figure 1:
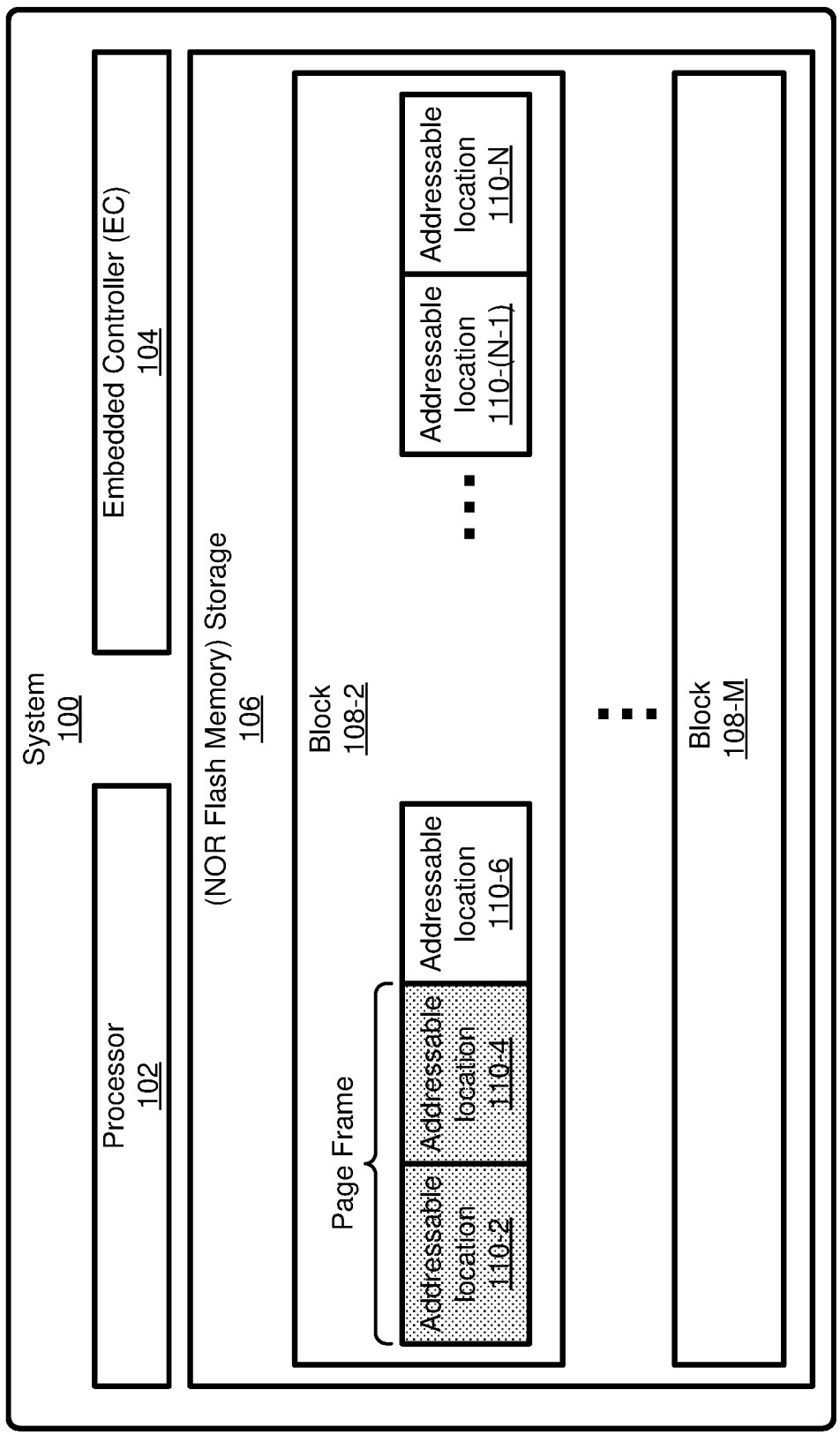
FIG. 1 is an example block diagram of an apparatus that implements data protection using features of a non-volatile memory.

FIG. 1 illustrates an example block diagram of an apparatus that implements data protection using features of a non-volatile memory. Particularly, the apparatus may include the computer system 100. As depicted, the computer system 100 includes at least one processor 102, a controller or an embedded controller (EC) 104, and a storage 106.

The storage 106 further includes a plurality of M blocks such as a first block 108-2, a second block 108-4, and up to last block 108-M. Each of these M blocks includes addressable locations. As depicted, the first block 108-2 includes addressable locations 110-2 to 110-N. The addressable locations of each block may be selected from a group consisting of a bit, a byte, a word, a page, or some combination thereof.

A data set is written into multiple addressable locations. For example, a data set may be written over addressable locations 110-2 and 110-4. This is indicated by these addressable locations being depicted as a shaded pattern in FIG. 1. In this example, the data set is written on a page frame of the block 108-2. The page frame may include a smallest unit that can be written with a data set, while the block may be the smallest unit of the storage 106 that can be erased. In this case, the block may include a plurality of page frames for the N addressable locations.

The data set may include a data name, data size, and data to be written. For example, the data name, data size, and the data include a particular file name, size of the particular file, and file contents, respectively.

The computer system 100 may include (but is not limited to) a computer, a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

The processor 102 may include one or more processors that may be coupled to the EC 104 and the storage 106. The processor 102, for example, may facilitate running of operating system (OS) on the computer system 100, while the EC 104 may facilitate secure boot of the OS. The EC 104 may further generate the data sets that may be written into the blocks 108. In some cases, these data sets may be accessible to the EC 104 but not the processor 102.

The storage 106 may include a non-volatile storage such as, but not limited to, a solid-state non-volatile computer storage medium that employs NOR logic gates. An example of this type of solid-state non-volatile computer storage is a NOR flash memory that utilizes the NOR logic gates. The NOR flash memory may provide faster reading of data; however, it may take longer to erase and write new data because of its block-erasure feature.

As depicted, the storage 106 is a NOR flash memory that may be divided into M blocks. Each block of the M blocks may be initially initialized as a fresh block. That is, the fresh block may include the block where all addressable locations 110-2 to 110-N are set to one binary value such as "one."

Referencing the first block 108-2, the shaded addressable locations 110-2 to 110-4 may indicate that the addressable locations 110-2 to 110-4 are valid, and not altered. However, in a case where a subsequent data set is to be written on the first block 108-2, then the addressable locations 110-2 to 110-4 may be invalidated by changing a binary value of at least one bit of the addressable location from 1 to 0. This value-change may indicate both invalidity and lack of integrity of the already written data set on the addressable locations 110-2 to 110-4.

Prior to the invalidating of the addressable locations 110-2 to 110-4, it is assumed that the first block 108-2 may still have available spaces or page frames to accommodate the subsequent data set to be written.

For example, the first block 108-2 may still have available page frames covered by the addressable locations 110-6 to 110-N. In this example, the subsequent data set may be written on these available page frames after the invalidation of the previous data set. However, if there are no more available spaces for the subsequent data set, then the EC 104 may perform a block-erasure of the first block 108-2. In the case of block-erasure, the subsequent data set may be written on a next block 108-4, or on the same block 108-2 after the initialization to become a fresh block again.

In an embodiment, a threshold may be configured to determine whether there is enough memory space or page frames to accommodate the subsequent data set to be stored. If there are no available page frames within the block to write the subsequent data set, then a block-erasure is essential prior to the storing of the subsequent data set on the same block. However, if page frames are still available, then the previously valid data set is invalidated, and the subsequent data set may be stored on the same block.

For example, the first block 108-2 is a 4 MB block with 500-page frames. In this example, each page frame has a size of 8 Kb. Thus, if each page frame is covered by two addressable locations 110 such as depicted in FIG. 1, then the first block 108-2 may include 1,000 addressable locations for the 500-page frames of the first block 108-2. Furthermore, for an 8 Kb size page frame and byte-size addressable location, at least 12 bits may be utilized by the addressable locations 110-2 to 110-4 to cover each 8 Kb page frame.

For this 4 MB block 108-2, the threshold may be set, for example, to have a value of 500. That is, for each data set written onto the block 108-2, a page frame counter is increased to 1. When the page frame counter is equal to the threshold value of 500, then the EC 104 may perform the block-erasure on the 4 MB block 108-2. Otherwise, the EC 104 may perform invalidation of the previously valid data set prior to the writing of the subsequent data set as described herein. This operation is made to avoid time-consuming block-erasure which may take several milliseconds for the block with 500-page frames. Furthermore, this will minimize the wearing of the first block 108-2 due to high erasure cycles.

When the page frame counter is still below the threshold of 500 in the example above, the invalidation of the previous data set may include changing the bit-value of the addressable location of the data set. As depicted, the addressable locations 110-2 to 110-4 may be invalidated by changing a bit of these addressable location from 1 to 0. As long as there is a bit-1 left on the addressable locations 110-2 to 110-4, then the invalidation operation as described herein may be implemented.

For example, after writing the first data set to the addressable locations 110-2 to 110-4, the resulting bits of the addressable locations 110-2 to 110-4 include 1111 0000 0000 0000. In this example, the addressable locations 110-2 to 110-4 may be invalidated by changing the first bit (1) into 0. In other words, the invalidated addressable locations 110-2 to 110-4 may now include 0111 0000 0000 0000. At this state, the value-change in the bits of the addressable locations 110-2 to 110-4 indicate alteration on the first data set.

After updating of the tag of the first data set in the foregoing paragraph, the second data set can be written into the block 108-2 without overwriting the addressable location of the first data set. For example, the second data set is written using the addressable locations 110-20 to 110-22. In this example, the second data set does not overwrite the addressable locations 110-2 to 110-4 of the first data set.

The above generation of the data set and the process of tag updating may similarly apply to the generated third data set, fourth data set, and so on. For example, the third data set is generated next by the EC 104. In this example, the third data set may similarly include a tag that indicates a valid third data set.

Thereafter, the tag of the second data set is updated to invalidate the second data set. For example, the tag of the second data set is set to the opposite binary value as that the binary value of the addressable locations of the fresh block. In this example, the initial binary value of "one" is changed to "zero." This change in the bit value of the addressable locations indicates invalidity and alteration of the second data set.

In an embodiment, the EC 104 may execute instructions to generate the first data set, and write the first data set into a fresh memory block 108-2. Thereafter, the EC 104 may update the tag of the first data set, and write the subsequent second data set into the block 108-2. That is if the threshold has not been reached. This storing of the second data set 112-4 is without overwriting the addressable locations 110-2 to 110-4 of the already written first data set. The EC 104 may similarly execute the same instructions in processing the generated third data set, fourth data set, etc.

The process for storing and updating of the data sets 112 as described in the first block 108-2 above may similarly apply to the second block 108-2, third block 108-6, and so on, up to the last block 108-M.

Figure 2:
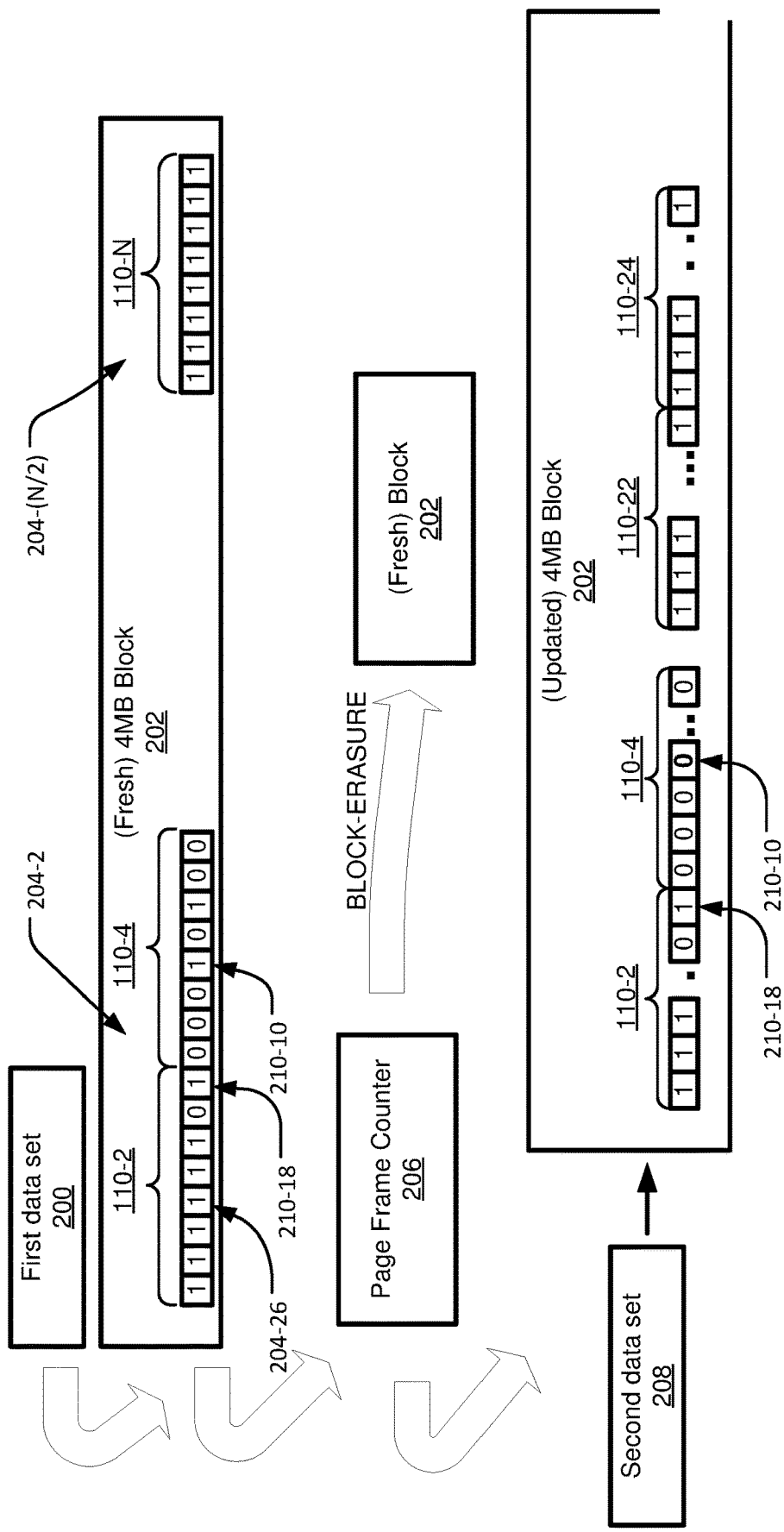
FIG. 2 illustrates an example implementation of storing and updating of data set in a non-volatile memory.

FIG. 2 illustrates an example implementation of storing and updating data set in a non-volatile memory.

As depicted, FIG. 2 includes a first data set 200, a block 202 that is divided into a plurality of page frames 204, a page frame counter 206, a second data set 208, and addressable location bits 210. The block 202, for example, is a 4 MB block that is divided into 500-page frames 204 of 8 Kb size for each page frame. The 500-page frames 204 are further represented by 1000 addressable locations where each addressable location includes a byte or 8 bits.

In an embodiment, the fresh block 202 may include a common first binary value bit 1s on all of its addressable locations 110. For example, after an initialization of the block 202, the first binary value of all addressable location bits 210 are set to a common binary value 1. In another example, a block-erasure of the block 202 is performed. In this other example, the first binary value of all addressable location bits 210 are similarly set to 1s. The block-erasure, for example, may be performed when the page frame counter 206 has reached a threshold value of 500, which is the total number of page frames that can be written with data set as described herein.

As shown, the first data set 200 is written into the page frame 204-2 of the fresh block 202. As a result, some of the addressable location bits 210 are changed to 0s, while the rest remain as 1s. For example, after writing the first data set 200 into the page frame 204-2, the addressable locations 110-2 and 110-4 include addressable location bits "11111101" and "00010100," respectively. In this example, the bits "1" can still be programmed or changed to "0" for updating purposes; however, the "0s" cannot be changed to "1s" without performing block-erasure on the block 202.

With the stored first data set 200 on the addressable locations 110-2 and 110-4, the page frame counter 206 is incremented by one. Thereafter, the value of the page frame counter 206 may be compared to a threshold value of 500, which is the total number of page frames that can be written with data set as described herein.

In a case where the page frame counter 206 is lesser than the threshold value, then updating of the block 202 for subsequent storing of data set is performed. The updating may include setting the binary value of the addressable location 110 from 1 to 0.

For example, referencing the addressable locations 110-2 and 110-4 that include addressable location bits "11111101" and "00010100," respectively, each addressable location bit that has a "1" value can still be changed to 0 for updating purposes. As depicted, the addressable location bit 210-10 is set from the first binary value of 1 to the second binary value of 0. Similarly, the other addressable location bit with "1" value may be changed to "0" when the updating is performed. In this example, the change in bit value indicates that the stored first data set 200 is invalid and altered.

With the updated block 202, the second data set 208 may be written on available page frame 204 and without overwriting the addressable locations 110-2 and 110-4. For example, the second data set 208 may be written on the addressable locations 110-22 and 110-24.

In a scenario where the incremented page frame counter 206 is at least equal to the threshold value, then the block-erasure is performed before the second data set 208 is written into the block 202. Optionally, the second data set 208 may be written into another block 202 if the previous block has reached its erasing cycle peak.

In an embodiment, the EC 104 may append a message authentication code (MAC) to the stored data set on the block 202. For example, EC 104 appends an HMAC, which is a type of MAC that is based on keyed cryptographic hash function. In this example, the HMAC may include a fixed size value or "tag" that may be used to verify correctness and origin of the associated data set. Based on this tag, the EC 104 may detect whether changes were made to the stored data set. This is true regardless of whether the stored data is encrypted.

For example, the EC 104 may calculate an initial value of the appended HMAC using an algorithm that utilizes data set name; data set size, and data value. During a read operation, the EC 104 may verify the appended HMAC by calculating current values in the block 202, and comparing these current values with the initial value of the appended HMAC. This comparison may indicate the integrity of the associated data set as described herein.

Figure 3:
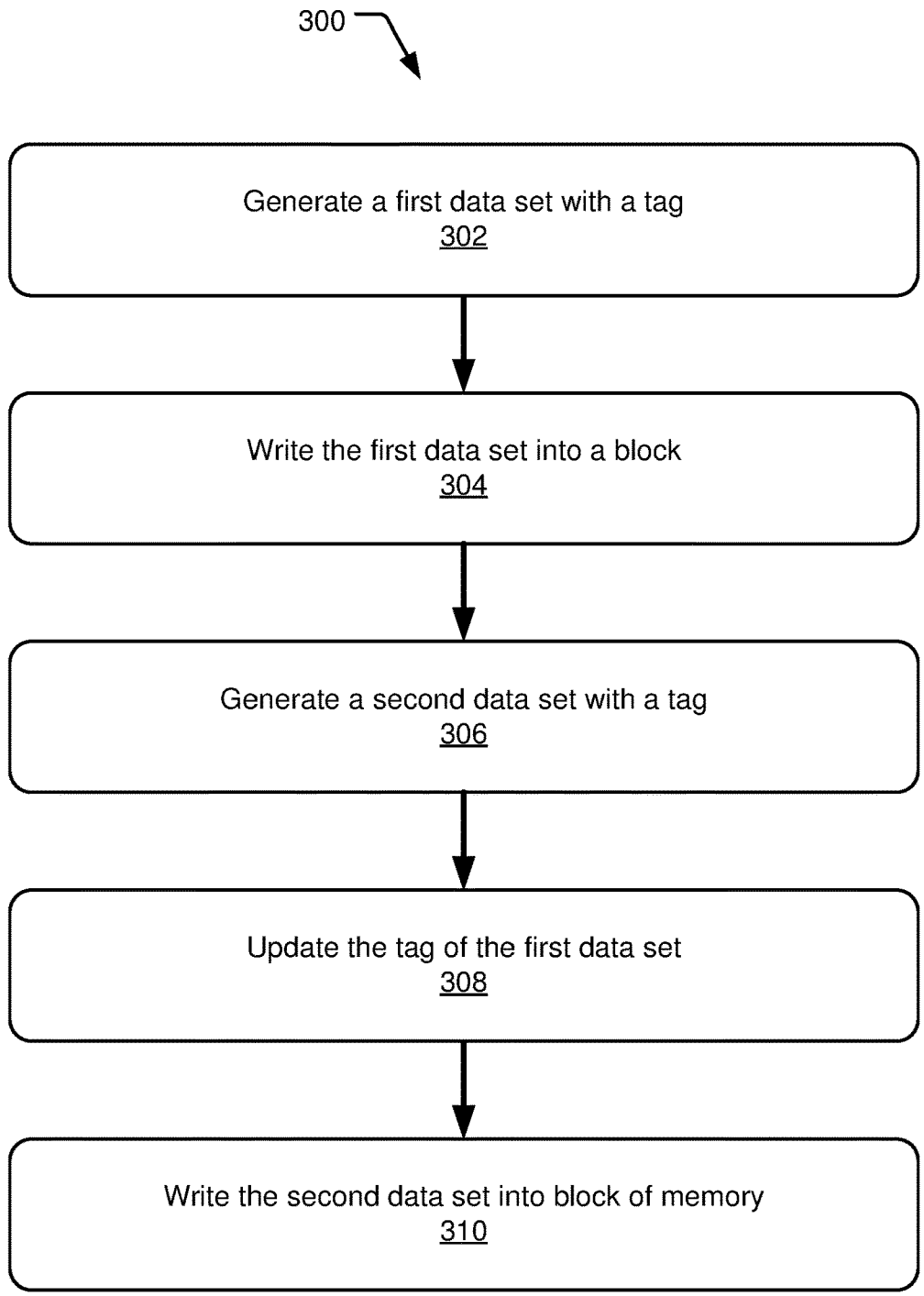
FIG. 3 illustrates a flowchart of an example process for protecting data through use of non-volatile memory features.

FIG. 3 shows a flowchart of an example process 300 for protecting data through use of non-volatile memory features. The example process 300 may be performed by, for example, the computer system 100. For the purposes of discussion, an example device like the computer system 100 is described as performing the operations of the example process 300.

At block 302, the example device generates a first data set with a portion thereof including a tag that indicates that the first data set is valid. For example, the computer system 100 and particularly, the EC 104 generates the first data set 200 that includes the addressable locations 110-2 and 110-4 as the tag.

At block 304, the example device writes the first data set into a block of memory. Before this write operation is performed, this block of memory is considered to be a fresh block. A fresh block is a block of memory having multiple addressable locations set to a common first binary value before the write. The common first binary value before the write is, for example, a logic 1. In other words, a fresh block is one that has never been written to or has been blocking erased.

For example, the computer system 100 and particularly, the EC 104 write the data set 200 into the block 202. In this example, the binary value of all addressable locations 110 is initially set to "one" to have a fresh block that is ready to be written with the first data set. With the fresh block, the data set 200 is written into the block 202.

A suitable memory which may be the subject of this example process 300 is a solid-state non-volatile computer storage medium that employs NOR logic gates. That is, a NOR flash memory.

At block 306, the example device generates a second data set including a tag that indicates that the second data set is valid. For example, the EC 104 generates the subsequent data set 208 that includes an indicating a valid second data set 208.

At block 308, the example device updates the tag of the first data set to indicate that the first data set is invalid. The updating the tag to invalidate the first data set includes setting addressable locations of the tag of the first data set to a second binary value, which is different from the first binary value. For example, the first binary value of the addressable location bit 210-10 is initially a logic one after initialization or block-erasure. In this example, the updating of the tag includes setting a second binary value that is different from the first binary value. For example, the first binary value is changed or set to "zero." In this example, the change indicates invalid data set 200.

At block 310, the example device writes the second data set to addressable locations in the block of memory other than the addressable locations of the first data set. It does not attempt to write over the already written data sets.

Of course, this can be repeated for a third, fourth, and any subsequent data sets. Once the block is full, this process can begin again with another block. Alternatively, once the block is full, the process can be repeated with original block after it is block erased.

Also, the update of the tag of the first data set to invalid also indicates that the first data set has been altered since written in the block. In addition, the update the tag to invalidate the first data set includes setting one of the addressable locations corresponding to the tag (i.e., the addressable locations storing the tag) to the opposite binary value as that the binary value of the addressable locations of the fresh block (e.g., from a logic one to a logic zero or vice versa).

The blocks 302-310 described above may represent instructions stored on computer-readable storage media that, when executed by at least one processor, may perform the recited operations.

What is claimed is:
1. A non-transitory machine-readable storage medium encoded with instructions executable by a processor, the machine-readable storage medium comprising instructions to:
  generate a first data set including a tag to indicate that the first data set is valid;
  write the first data set into a block of a memory, wherein the block of memory has multiple addressable locations set to a common first binary value before the write;
  after writing the first data set into the block of the memory, increment a page frame counter, wherein the page frame counter counts the number of page frames in the block of memory written to by the first data set;

generate a second data set including a tag to indicate that the second data set is valid;
compare the page frame counter to a threshold;
responsive to the page frame counter not meeting the threshold, update the tag of the first data set to indicate that the first data set is invalid, and write the second data set to addressable locations in the block of memory other than the addressable locations of the first data set; and
responsive to the page frame counter meeting the threshold, erase the block of the memory and write the second data set to the erased block of the memory.

2. The non-transitory machine-readable storage of claim 1, wherein the update of the tag of the first data set to invalid also indicates that the first data set has been altered since written in the block.

3. The non-transitory machine-readable storage of claim 1, wherein the memory is a solid-state non-volatile computer storage medium that employs NOR logic gates.

4. The non-transitory machine-readable storage of claim 1, wherein an addressable memory location in the block is a bit, a byte, a word, a page, or a combination thereof.

5. The non-transitory machine-readable storage of claim 1, wherein the first binary value is a logic one.

6. The non-transitory machine-readable storage of claim 1, wherein to update the tag to invalidate the first data set includes setting one of the addressable locations corresponding to the tag of the first data set to a second binary value, wherein the second binary value is different from the first binary value.

7. The non-transitory machine-readable storage of claim 1, wherein the instructions further include:
generate a third data set including a tag that indicates that the third data set is valid;
update the tag of the second data set to indicate that the second data set is invalid;
write the third data set to addressable locations in the block of memory other than the addressable locations of the first or second data set.

8. A non-transitory machine-readable storage medium encoded with instructions executable by a processor, the machine-readable storage medium comprising instructions to:
generate a first data set including a tag that indicates that the first data set is valid;
write the first data set into a block of a solid-state non-volatile computer memory that employs NOR logic gates, wherein the block of memory has multiple addressable locations set to a common first binary value before the write;
after writing the first data set into the block of the memory, increment a page frame counter, wherein the page frame counter counts the number of page frames in the block of memory written to by the first data set;
generate a second data set including a tag that indicates that the second data set is valid;
compare the page frame counter to a threshold;
responsive to the page frame counter not meeting the threshold, update the tag of the first data set to indicate that the first data set is invalid and write the second data set to addressable locations in the block of memory other than the addressable locations of the first data set, wherein the update includes setting one of the addressable locations corresponding to the tag of the first data set to a second binary value, wherein the second binary value is different from the first binary value; and
responsive to the page frame counter meeting the threshold, erase the block of the memory and write the second data set to the erased block of the memory.

9. The non-transitory machine-readable storage of claim 8, wherein an addressable memory location in a block is a bit, a byte, a word, a page, or a combination thereof.

10. The non-transitory machine-readable storage of claim 8, wherein the first binary value is a logic one.

11. The non-transitory machine-readable storage of claim 8, wherein the instructions further include:
generate a subsequent data set including a tag that indicates that the subsequent data set is valid;
update a tag of a previously written and otherwise valid data set to indicate that the previously written and otherwise valid data set is invalid;
write the subsequent data to addressable locations in the block of memory other than the addressable locations of any previously written data sets.

12. An apparatus comprising:
a solid-state non-volatile computer memory;
a controller coupled to the memory, the controller to:
generate a data set including a tag that indicates that the data set is valid;
write the data set into a block of the memory, wherein the block includes multiple addressable locations set to a common first binary value before the write;
after writing the data set into the block of the memory, increment a page frame counter, wherein the page frame counter counts the number of page frames in the block of memory written to by the first data set;
generate a subsequent data set including a tag that indicates that the subsequent data set is valid;
compare the page frame counter to a threshold;
responsive to the page frame counter not meeting the threshold, update the tag of the written data set to indicate that the written data set is invalid and write the subsequent data set to addressable locations in the block of memory other than the addressable locations of the invalid data set, wherein the update includes setting one of the addressable locations corresponding to the tag to a second binary value different from the first binary value; and
responsive to the page frame counter meeting the threshold, erase the block of memory and write the subsequent data set to the erased block of the memory.

13. An apparatus of claim 12, wherein an addressable memory location in a block is a bit, a byte, a word, a page, or a combination thereof.

14. An apparatus of claim 12, wherein the first binary value is set to logic one.

15. An apparatus of claim 12, wherein the update of the tag of the invalid data set to invalid also indicates that the invalid data set has been altered since written in the block.

* * * * *